US007546432B2

(12) United States Patent
Stacey et al.

(10) Patent No.: US 7,546,432 B2
(45) Date of Patent: Jun. 9, 2009

(54) PASS-THROUGH WRITE POLICIES OF FILES IN DISTRIBUTED STORAGE MANAGEMENT

(75) Inventors: Christopher H. Stacey, Swindon (GB); Eyal Zimran, London (GB)

(73) Assignee: EMC Corporation, Hopkinton, MA (US)

( * ) Notice: Subject to any disclaimer, the term of this patent is extended or adjusted under 35 U.S.C. 154(b) by 571 days.

(21) Appl. No.: 11/382,464

(22) Filed: May 9, 2006

(65) Prior Publication Data
US 2007/0266056 A1 Nov. 15, 2007

(51) Int. Cl.
*G06F 12/16* (2006.01)
*G06F 15/173* (2006.01)

(52) U.S. Cl. ............... 711/165; 711/162; 707/203; 709/213; 709/216; 709/226

(58) Field of Classification Search ............... 711/162, 711/165; 707/203; 709/213, 216, 226
See application file for complete search history.

(56) References Cited

U.S. PATENT DOCUMENTS

| | | | |
|---|---|---|---|
| 5,596,706 A | 1/1997 | Shimazaki et al. | |
| 5,835,954 A | 11/1998 | Duyanovich et al. | |
| 5,893,140 A | 4/1999 | Vahalia et al. | |
| 5,901,327 A | 5/1999 | Ofek | |
| 5,963,962 A | 10/1999 | Hitz et al. | |
| 5,974,563 A | 10/1999 | Beeler, Jr. | |
| 6,076,148 A | 6/2000 | Kedem | |
| 6,078,929 A | 6/2000 | Rao | |
| 6,185,661 B1 | 2/2001 | Ofek et al. | |
| 6,269,431 B1 | 7/2001 | Dunham | |
| 6,490,666 B1 | 12/2002 | Cabrera et al. | |
| 6,496,837 B1 * | 12/2002 | Howard et al. ............... 707/200 |
| 6,519,612 B1 * | 2/2003 | Howard et al. ............... 707/200 |
| 6,665,689 B2 | 12/2003 | Muhlestein | |
| 6,757,794 B2 | 6/2004 | Cabrera et al. | |
| 6,792,518 B2 | 9/2004 | Armangau et al. | |
| 6,804,719 B1 | 10/2004 | Cabrera et al. | |
| 6,938,039 B1 | 8/2005 | Bober et al. | |

(Continued)

OTHER PUBLICATIONS

Charles King, "A Worm Turn: EMC Introduces Centera Compliance Edition," Excerpt from Market Roundup, Apr. 11, 2003, The Sageza Group, Mountain View, CA, one page.

(Continued)

*Primary Examiner*—Jack A Lane
(74) *Attorney, Agent, or Firm*—Richard C. Auchterlonie; Novak Druce & Quigg, LLP

(57) ABSTRACT

A hierarchical storage system includes file servers and a policy engine server. Offline attributes are added to file system inodes in a primary file server, file system parameters are added in the primary server, offline read and write access method fields are added to a connection database, and the primary file server uses these attributes and parameters for selecting a particular read method or write method for access to an offline file or section of an offline file. The write methods follow a "write recall full" policy, a "pass-through write" policy, a "pass-through multi-version" policy, or a "directory write pass-through" policy. The pass-through multi-version policy results in a new offline version of a file each time that a client opens and writes to a multi-version file. The directory write pass-through policy results in a new offline file when a file is created within a write pass-through directory.

20 Claims, 12 Drawing Sheets

U.S. PATENT DOCUMENTS

| | | |
|---|---|---|
| 2003/0110188 A1* | 6/2003 | Howard et al. .............. 707/200 |
| 2005/0065986 A1 | 3/2005 | Bixby et al. |
| 2006/0212481 A1 | 9/2006 | Stacey et al. |
| 2006/0212746 A1 | 9/2006 | Amegadzie et al. |

OTHER PUBLICATIONS

Henry Baltazar, "SnapLock Locks Down Info," eWeek.com, Oct. 20, 2003, Ziff Davis Internet, Woburn, MA, 4 pages.

"SnapLock (TM) Compliance and SnapLock Enterprise Software," Network Appliance, Inc., Sunnyvale, CA, 2003, 2 pages.

"Information Lifecycle Management: An Automated Approach," Technical White Paper, EMC Corporation, Hopkinton, MA, Dec. 8, 2003, 20 pages.

"EMC Centera Partner Solutions, EMC-LEGATO E-mail Archiving Solution," EMC Corporation, Hopkinton, MA, Jul. 2004, 4 pages.

"CFA: File System Archiving with Centera," TANEJA Group, Inc., Hopkinton, MA, May 2005, 7 pages.

"EMC Celerra FileMover Functionality," EMC Corporation, Hopkinton, MA, Jul. 2005, 4 pages.

"EMC Centera FileArchiver," EMC Corporation, Hopkinton, MA, Aug. 2005, 4 pages.

"EMC Centera FileArchiver," emc.com, EMC Corporation, Hopkinton, MA, printed Oct. 27, 2005, 2 pages.

"SnapLock (TM) Compliance and SnapLock Enterprise Software," netapp.com, Network Appliance, Inc., Sunnyvale, CA, printed Dec. 15, 2005, 3 pages.

EMC Celerra SE5 File Server, EMC Corporation, Hopkinton, Mass. 01748-9103, Feb. 2002, 2 pages.

"Celerra File Server in the E-Infostructure," EMC Corporation, Hopkinton, Mass., 2000, 12 pages.

"Celerra File Server Architecture for High Availability," EMC Corporation, Hopkinton, Mass., Aug. 1999, 11 pages.

"Network Data Management Protocol (NDMP)," ndmp.org; NDMP White Paper, "Protocol Specification Summary, Document Version: 1.7.2S," ndmp.org; "Legato Systems Embraces the NDMP Standard: Legato Networker Software to be NDMP Compliant in Q3," legata.com; published at least as early as Oct. 11, 1999, 17 pages.

R. Stager and D. Hitz, Internet Draft filename "draft-stager-iquard-netapp-backup-05.txt," Network Data Management Protocol (NDMP), last update Oct. 12, 1999, 73 pages.

"Remote Mirroring Technical White Paper," Copyright 1994-2002 Sun Microsystems, Santa Clara, CA, published at least as early as May 17, 2002 at sun.com, 25 pages.

"EMC TechNote: Celerra Replicator," EMC Corporation, Hopkinton, MA, 2002, 5 pages.

"Veritas Volume Replication and Oracle Databases," A Solutions White Paper, Veritas Software Corporation, Mountain View, CA, May 29, 2000, 31 pages.

"EMC Symmetrix Data Migration Services," EMC Corporation, Hopkinton, MA, Jul. 2001, 4 pages.

"Global Recovery Demonstration: SRDF/A and PRIMECLUSTER," EMC Corporation, Hopkinton, MA, Feb. 2004, 27 pages.

"EMC Open Replicator for Symmetrix," EMC Corporation, Hopkinton, MA, Jan. 2005, 12 pages.

John Phillips, "Storage Consolidation and Data Protection using MultiStoreTM," Network Appliance, Inc., Sunnyvale, CA, Feb. 18, 2003, 13 pages.

"Celerra Data Migration Service (CDMS)," EMC Corporation, Hopkinton, MA, Jan. 2002, 14 pages.

"EMC Centera Solutions, EMC Avalon-Centera Single Point of Access Solution," EMC Corporation, Hopkinton, MA, Oct. 2002, 4 pages.

Technology Brief—Aug. 2002, "Automated Resource Management," The Enterprise Storage Group, Milford, MA, Aug. 2002, 3 pages.

"Oracle9i with Celerra File Server over NFS," EMC Corporation, Hopkinton, MA, Nov. 22, 2002, 15 pages.

Nancy Marrone, Product Brief—Apr. 2003, "Astrum's Active Storage Management Solution Key to EMC's Mid-Tier Software Offering," The Enterprise Storage Group, Milford, MA, Apr. 2003, 2 pages.

Data Sheet, "EMC AVALONidm, Intelligent data management to lower total cost of storage," EMC Corporation, Hopkinton, MA, Jul. 2003, 4 pages.

Jamie Gruener et al., "Digital Content and Storage Management in the Media and Entertainment Industry," The Yankee Group, Boston, MA, Nov. 2003, 16 pages.

On Life in Information, vol. 1, 2004, Doing More with Storage, EMC Corporation, Hopkinton, MA, Mar. 2004, 32 pages.

"Information Lifecycle Management Updates," EMC Corporation, Hopkinton, MA, Oct. 2004, 2 pages.

"EMC: Information Lifecycle Management: Real Results for Business Realities," EMC Corporation, Hopkinton, MA, http://www.emc.com/ilm/ilm_update, printed Jan. 26, 2005, 4 pages.

"OLE Component Object Model," Object Services and Consulting, Inc., Dallas, Texas, objs.com, printed Mar. 14, 2005, 7 pages.

Uresh Vahalia, Unix Internals: The New Frontiers, Chapter 9, "File System Implementations," Prentice-Hall, Inc., New Jersey, 1996, p. 261-289.

* cited by examiner

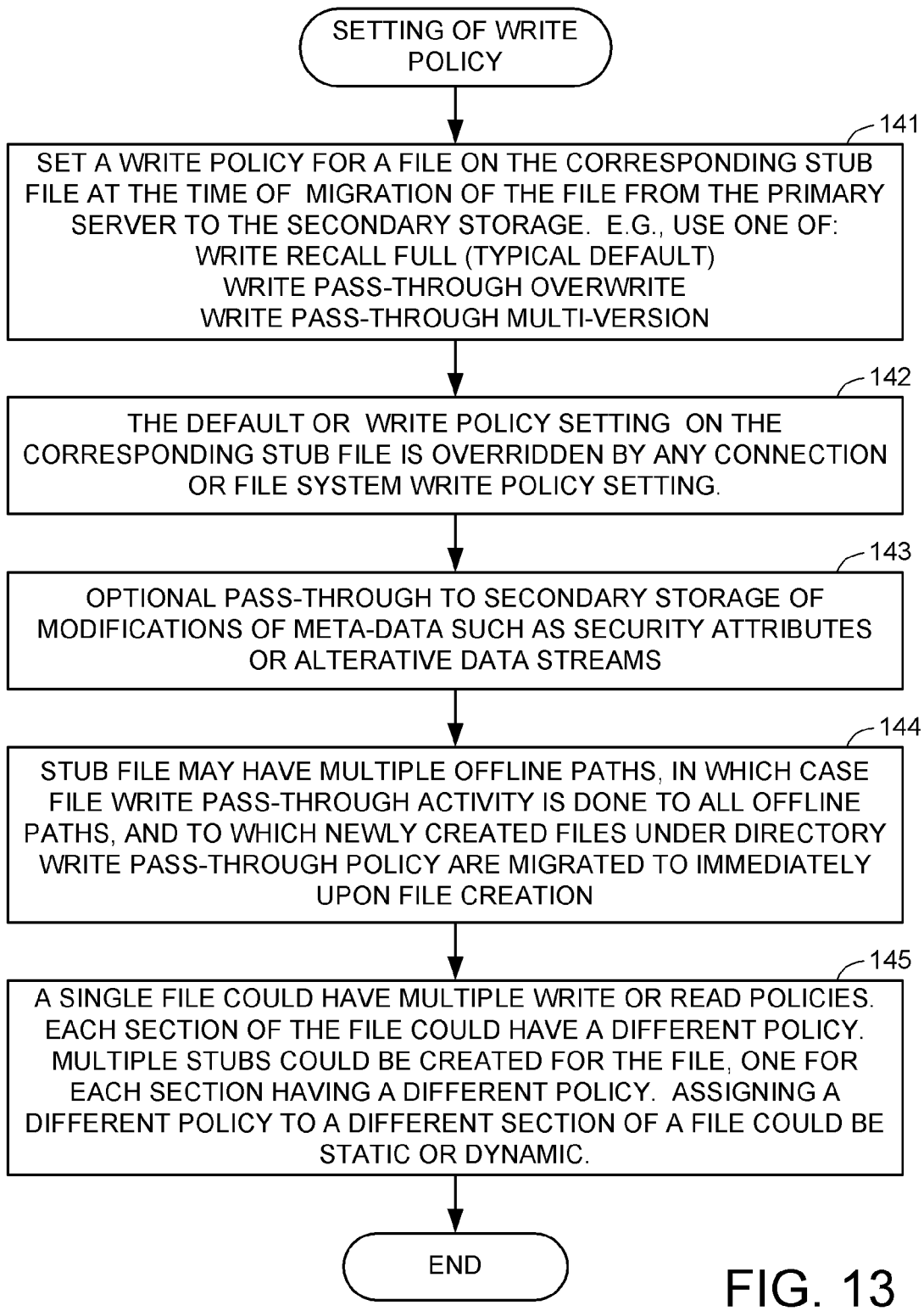

PASS-THROUGH WRITE POLICIES OF FILES IN DISTRIBUTED STORAGE MANAGEMENT

FIELD OF THE INVENTION

The present invention relates generally to data networks, and more particularly to migration of files between file servers in a data network. The invention specifically relates to pass-through write policies of files in distributed storage management.

BACKGROUND OF THE INVENTION

Data network technology permits multiple users to share economically access to files in a number of file servers. Problems arise, however, in the assignment of files to particular servers. For example, it may be desirable to move a file from one file server to another when a new server is added to the network. A "CDMS" brand of data migration service provided by EMC Corporation of Hopkinton, Mass., can be used to move files from one file server to another while permitting concurrent client access to the files.

Files are also often moved between file servers in order to relocate infrequently accessed files from feature-rich, expensive, and highly-protected high-speed disk storage to more economical and possibly slower mass storage. In such a system, the high-speed disk storage is referred to as primary storage, and the mass storage is referred to as secondary storage. When a client needs read-write access to a file in the secondary storage, the file typically is moved back to the primary storage, and then accessed in the primary storage. This kind of migration of files between levels of storage in response to client requests based on file attributes such as the time of last file access and last file modification is known generally as policy-based file migration or more specifically as hierarchical storage management (HSM). It is desired for such policy-based or hierarchical storage management to be transparent to the clients, yet in practice there is always a trade-off between cost of storage and delay in file access.

In a data processing network employing hierarchical storage management, a client typically accesses a primary file server containing the primary storage, and the secondary storage is often in another file server, referred to as a secondary file server. When a file is moved from a primary file server to a secondary file server, the file in the primary file server is typically replaced with a stub file that contains attributes of the file and a link to the new file location in the secondary file server. The stub file can be accessed to redirect an access request from a client to the new file location in the secondary server, or to migrate data from the present file location back to the primary file server. This stub file can be a symbolic link file in a UNIX-based file system, or a shortcut file in a Microsoft WINDOWS file system. In a computer using the Microsoft WINDOWS operating system, access to a stub file may automatically result in access to the new file location. For example, an attempt to execute or open a shortcut will cause the Microsoft WINDOWS operating system to execute or open the target of the shortcut.

EMC Corporation has used a write policy known as "write recall full" for hierarchical storage systems employing its "CELERRA" (Trademark) brand of cached disk array for primary storage. In accordance with this "write recall full" policy, when a client requests the primary cached disk array for access to a file that has been migrated to secondary storage, either part or all of the "offline" file is copied from the secondary storage back to the primary storage. Once the copying brings part of the file "online," the primary cached disk array may provide high-speed read-write access to the file. When the cached disk array is used in combination with much slower secondary storage, the "write recall full" policy may provide efficient and economical use of the storage and network resources.

SUMMARY OF THE INVENTION

A number of problems have been found to occur with the "write recall full" policy. First, a small write to a large file might take a relatively long time, and require significant system and network resources. Second, if there is insufficient file system space in the primary storage so that the file cannot be brought online, then the write can fail even if the write is to a part of the file that already exists. This is often a surprise to applications and users. Thirdly, the "write recall full" policy implicitly assumes that a file that has been modified has increased in value to the business to the extent that it should reside on primary rather than secondary storage. This may not be true. Finally, the "write recall full" policy results in different versions of the file on primary and secondary storage. If this is not desired, either a storage administrator or policy and migration application must intervene to remove unwanted versions of files from secondary storage.

The present invention provides "pass-through write" policies that are tailored to solving the problems identified above. A "pass-through write" policy permits the primary storage system to perform read-write access to an "offline" file on behalf of a client by accessing the file in secondary storage. Thus, a file is modified in response to a client request without first being recalled to primary storage. The write pass-through policies for offline files include a "pass-through overwrite" policy and a "pass-through multi-version" policy. In addition, the present invention provides a write pass-through policy for directories that allows new files created within specified directories to be written directly to secondary storage rather than being written into primary storage first and then migrated.

In accordance with one aspect, the invention provides a method of operation in a data network including a file server for access to file data that is migrated between primary storage and secondary storage. The method includes the file server responding to a client request for write access to a specified file by checking whether file data of the specified file has been migrated from the primary storage to the secondary storage, and upon finding that file data of the specified file has been migrated from the primary storage to the secondary storage, performing a write pass-through in which data of the specified file is not recalled from the secondary storage to the primary storage in response to the client request for write access to the specified file and file data from the client is written to the secondary storage. In addition, the file server follows a write pass-through multi-version policy resulting in a new offline version of a multi-version file each time that a client opens and writes to the multi-version file.

In accordance with another aspect, the invention provides a method of operation in a data network including a file server for access to file data that is migrated between primary storage and secondary storage. The method includes the file server responding to a client request for write access to a specified file by checking whether file data of the specified file has been migrated from the primary storage to the secondary storage, and upon finding that file data of the specified file has been migrated from the primary storage to the secondary storage, performing a write pass-through in which data of the specified file is not recalled from the secondary storage to the primary storage in response to the client request for write access to the specified file and file data from the client is written to the secondary storage. In addition, the file server follows a directory write pass-through policy resulting in a new offline file when a file is created within a write pass-through directory.

In accordance with yet anther aspect, the invention provides a method of operation in a data network including a file server for access to file data that is migrated between primary storage and secondary storage. The method includes the file server responding to a client request for write access to a specified file by checking whether file data of the specified file has been migrated from the primary storage to the secondary storage, and upon finding that file data of the specified file has been migrated from the primary storage to the secondary storage, performing a write pass-through in which data of the specified file is not recalled from the secondary storage to the primary storage in response to the client request for write access to the specified file and file data from the client is written to the secondary storage. In addition, the file server follows different write migration policies for different sections of a multi-section offline file, as specified by at least one write policy attribute of the multi-section offline file.

BRIEF DESCRIPTION OF THE DRAWINGS

Additional features and advantages of the invention will be described below with reference to the drawings, in which:

FIG. 13 is a flowchart showing various ways of setting the write migration policies.

Figure 1:
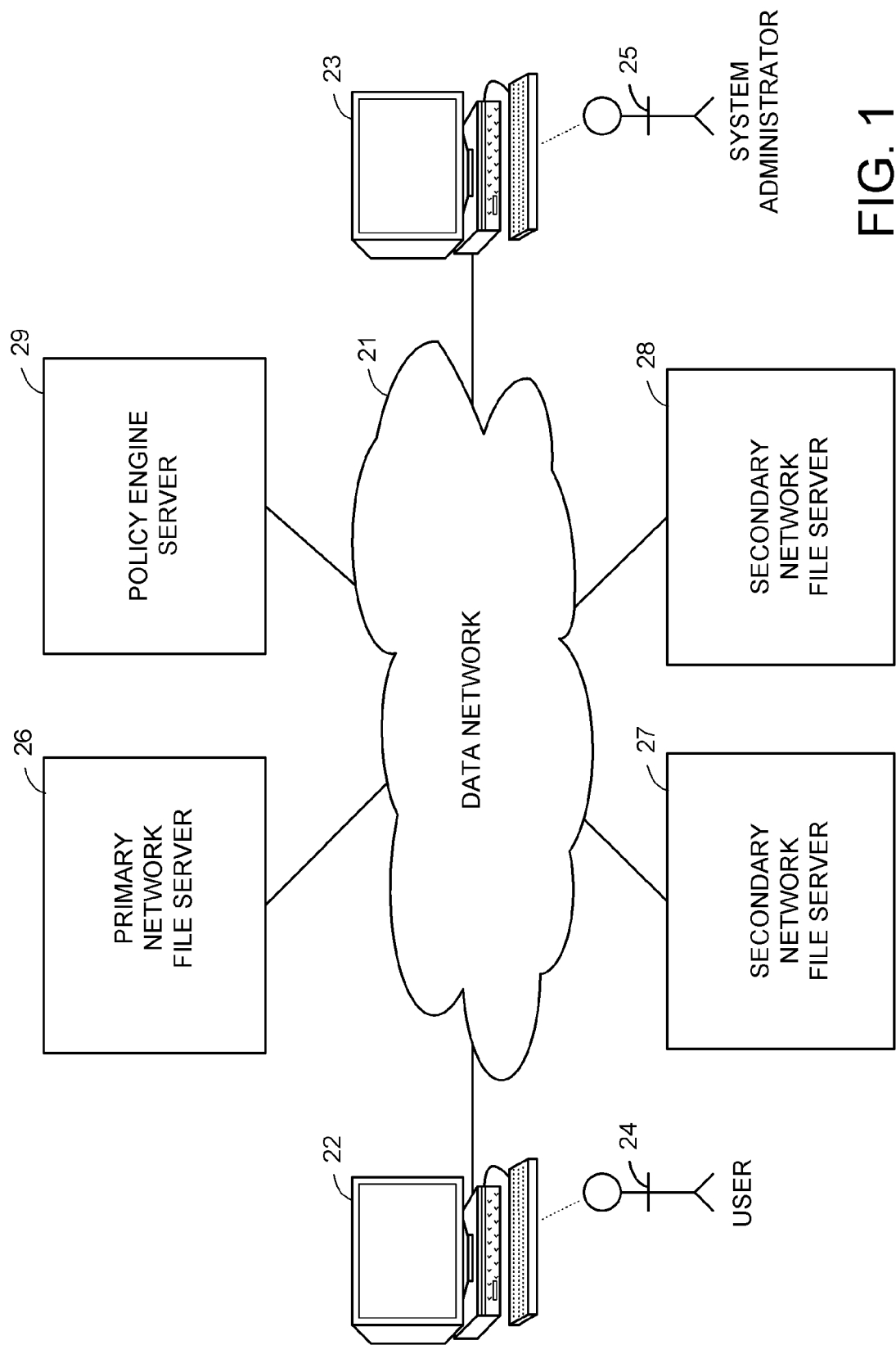
FIG. 1 is a block diagram of a data network including file servers for serving client workstations operated by respective users, and a policy engine server for initiating migration of file data from a primary file server to at least one secondary file server.

While the invention is susceptible to various modifications and alternative forms, specific embodiments thereof have been shown in the drawings and will be described in detail. It should be understood, however, that it is not intended to limit the invention to the particular forms shown, but on the contrary, the intention is to cover all modifications, equivalents, and alternatives falling within the scope of the invention as defined by the appended claims.

DETAILED DESCRIPTION OF THE PREFERRED EMBODIMENTS

With reference to FIG. 1, there is shown a data processing system including a data network 21 interconnecting a number of clients and servers. The data network 21 may include any one or more of network connection technologies, such as Ethernet or Fibre Channel, and communication protocols, such as TCP/IP or UDP. The clients include work stations 22 and 23. The work stations, for example, are personal computers operated by human users 24, 25. The servers include a primary network file server 26, secondary network file servers 27 and 28, and a policy engine server 29.

The primary network file server 26, for example, is a cached disk array as described in Vahalia et al., U.S. Pat. No. 5,893,140 issued Apr. 6, 1999, incorporated herein by reference. Such a cached disk array 26 is manufactured and sold by EMC Corporation, 176 South Street, Hopkinton, Mass. 01748. The secondary network file serves 27 and 28, for example, are similar to the primary network file server 26 except that they have a relatively small amount of cache memory, and a relatively large array of relatively slow, high-capacity disk drives, such as ATA disk drives.

The primary network file server 26 is programmed to respond to a command for migrating the data of a specified file from the primary file server to a specified secondary network file server while retaining metadata for the file in the primary file server. The metadata for the file includes the typical file attributes and also additional offline attributes including a complete network pathname to the specified secondary file server and the file data in the specified secondary file server. Once the file data has been migrated, the file is said to be "offline." The primary file server is also programmed to access the file data of offline files in various ways in response to client requests for read or write access to the offline files. In a preferred implementation, the secondary file servers are configured to disallow the clients from directly accessing the file data that has been migrated from the primary file server. Also, in the preferred implementation, the primary file server is configured to disallow the migration of data from directories so that directories are not permitted to be offline files. However, in an alternative implementation, the primary file server could be configured to allow migration of data from directories so that directories could be permitted to be offline files.

The data processing system in FIG. 1 includes a policy engine server 29 that decides when a file in the primary network file server should become offline. The policy engine server 29 is activated at scheduled times, or it may respond to events generated by specific file type, size, owner, or a need for free storage capacity in the primary network file server. Migration may be triggered by these events, or by any other logic. When free storage capacity is needed in the primary network file server, the policy engine server 29 scans file attributes in the primary file server in order to identify online files and to select an online file to become offline. The policy engine server 29 may then select a secondary network file server to become the secondary storage for the data of the selected online file, and send a migration command to the primary network file server specifying the selected online file and the selected secondary network file server. In a preferred implementation, however, the policy engine server 29 in not involved in any decision to restore an offline file to online status. Once data of a file has been migrated to secondary storage and the offline attributes of the file have been set to indicate that the file is offline, the policy engine server can be shut down without affecting in any way the recall of the file data from secondary storage.

It is also possible to pre-schedule a recall of specific files or directories. This can be done in preparation for a predicted need for this information. An example of such a situation is preparation of files that will be required to be read or modified for periodic reporting needs. For example, the primary network file server 26 maintains a recall list 75 of directories or files and a respective time in the future that each such directory or file should be migrated from secondary storage to the primary storage if the directory or file is offline at that time. The primary network file server, for example, places a directory or file on the recall list 75 in response to a request from a client. An example of a procedure for servicing the recall list 75 is further described below with reference to FIG. 6.

Figure 2:
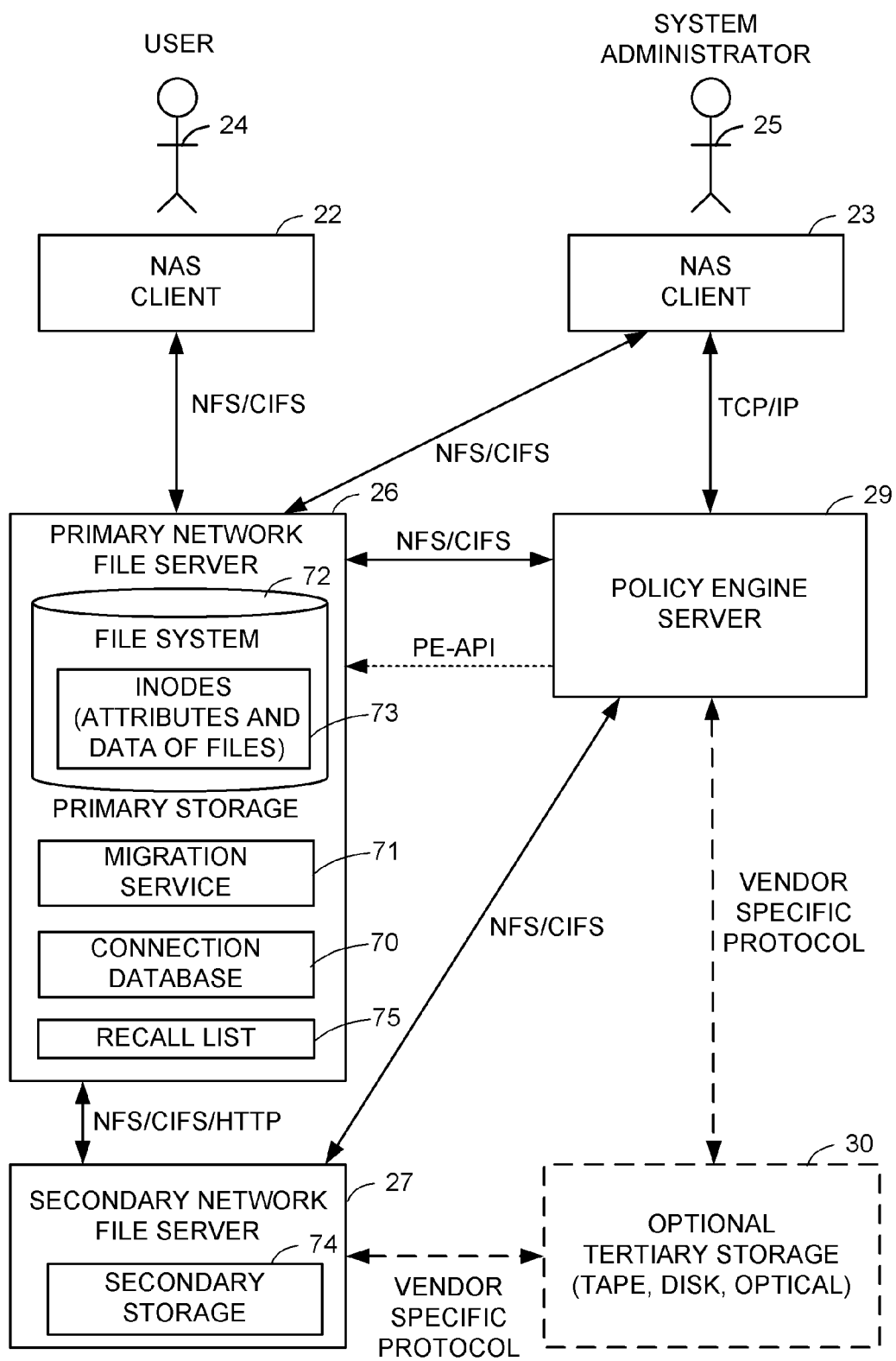
FIG. 2 is a diagram of data and control flow between the clients and servers in the data network of FIG. 1.

FIG. 2 shows the preferred flow of data and control between the clients and servers in the data network of FIG. 1. The network attached storage (NAS) clients 22, 23 use the network file system (NFS) or common internet file system (CIFS) protocols for access the primary network file server 26. The NAS client 23 of the system administrator 25 uses the TCP/IP protocol for setting policy rules in the policy engine 29. The policy engine server 29 uses NFS or CIFS for accessing attributes of files in the primary network file server 26 and in the secondary network file server 27. The policy engine server 29 sends a policy engine application interface (PE-API) command to the primary network file server 26 in order to initiate migration from the primary network file server 26 to the secondary network file server 27.

The primary network file server 26 and the secondary network file server 27 use the NFS, CIFS, or other data transfer protocols (HTTP, FTP, etc.) for migrating data from the primary network file server to the secondary network file server, and for the recall of data from the secondary network file server to the primary network file server. In order to migrate file data from the primary file server to the secondary file server, a NFS or CIFS connection is set up between the primary file server and the secondary network file server.

In a preferred implementation, the primary network file server has a connection database 70 for each file system 72 stored in the primary network file server. For example, the connection database for the preferred implementation includes the following fields: for CIFS, the Server Name, Share name, User name, Password, Domain Server, and WINS server; for NFS, the Server name, Path of exported share, Use Root credential flag, Transport protocol, Secondary server NFS/Mount port, Mount protocol version, and Local port to make connection; and for HTTP, the HTTP server URL, HTTP Server Port, Local port, migration method override, user name and password, and CGI Y/N. For each type of connection, the connection database also includes a field for storing a specification of a migration method override. Using the connection database avoids storing all the credential information in the offline inode, and ensures that the connection information will survive a re-boot of the primary network file server.

A file is defined by one of the inodes 73 in the file system 72. Prior to migrating data during the change of the state of a file from online to offline, the file is associated with such a connection defined in the connection database 70 for the file system 72 containing the file. This is done by setting an offline attribute of the file with a connection ID that is an index or pointer to an entry for the connection in the connection database 70 for the file system 72.

The secondary file server 27 should enable writes by the policy engine server 29 during migration from the primary storage to the secondary storage 74. However, the secondary store file should not be modified after the initial data migration to secondary storage by the policy engine. This would cause I/O errors when reading offline data from the primary storage 74 since the modification time and size attributes of the primary store file are checked for consistency against the modification time and size attributes of the secondary store file when the primary storage system recalls offline file data from the secondary storage. Also reads from offline files on snapshots and backups would be inconsistent if the file on the secondary storage would be modified.

Virus checking programs should not update files on the secondary file server 27, because this may cause data inconsistency of files that correspond to offline inodes on the primary store. No secondary store file should be modified after the initial creation, so viruses should not be found on a secondary store file unless they existed on the corresponding original file in the primary file server. If a virus is introduced into a secondary store file after migration from primary to secondary storage, data migration from secondary to primary storage during recall will fail if the modification time/size of the offline inode is out-of-sync with the secondary store file.

If using HTTP, NFS or CIFS, the secondary file server should allow connection by the file's owner from the primary file server, unless the connection associated with the file specifies root credentials. If the connection specifies root credentials, then the secondary file server should permit root access from the primary file server.

As further shown in FIG. 2, the data network may include optional tertiary storage 30 such as tape, disk, or optical storage. Such tertiary storage would use proprietary vendor specific protocols for transfer of data between the secondary network file server 27 and the tertiary storage, and for access of the policy engine server to the tertiary storage.

In a preferred implementation, a file migration service is used to copy a specified file from the primary network file server 26 to a new corresponding file on a secondary network file server. Then the online inode of the specified file in the primary network file server is converted to an offline inode in the primary network file server. The offline inode specifies a full absolute network pathname to the corresponding file in the secondary storage. Then all of the data blocks for the file in the primary network file server are freed.

When a client requests the primary file server for write access to a file, the write operation will fail if the file system is read-only. If the file's inode is already online, writes proceed as usual. Otherwise, the file is accessed in accordance with a write policy selected for the file, as will be further described below with reference to FIG. 13. For example, the typical default write policy is a "write recall full" migration of the file data back to the primary server. This migration will fail if there is not enough free space for the file system on the primary file server. The "write recall full" migration includes creating a migration inode and allocating file system data blocks, reading the file data from the secondary file server and writing the file data to the allocated file system data blocks and updating the migration inode. Once all of the file data has been migrated, the file is made online by converting the migration inode to an online inode, substituting the online inode for the offline inode for the file, and then de-allocating the offline inode for the file. The copy of the file in the secondary storage should not be deleted unless there is no snapshot or backup that refers to it. Once the file becomes online in the primary data storage system, the primary file server accesses the online file in the usual fashion.

When a client requests the primary file server for read access to a file, the read operation proceeds as usual if the inode is online. Otherwise, a particular one of a number of predefined methods for read access to an offline file is selected for accessing the file data from the secondary file server that stores the file data for the file. The predefined methods for read access to an offline file include a full read migration, a partial read migration, and a pass-through read of the file data. If there is insufficient free storage on the primary file server to support a full or partial read migration, then the pass-through method is selected. The pass-through method is also used for accessing a file in a file system that is mounted as read-only.

In a full read migration, the file is brought online by a full migration of the file data from the secondary file server storing the data of the file to the primary file server. Then the client accesses the online file in the usual fashion.

In a pass-through read of the file data, the primary file server reads the file data requested by the client from the secondary file server and returns the requested file data to the client, without creating a migration inode or allocating file system blocks for storage of the file data in the primary file server.

In a partial read migration, the client requests a read of specific file data. The primary file server responds by partial migration of file system data blocks including at least the specific file data. The file server may also migrate a certain number of additional file system data blocks following the last file system data block containing the specific file data, such as 128 additional file system data blocks. If all of the file system data blocks of the file happen to be migrated, the offline file can be made online. Otherwise, the migration inode becomes substituted for the offline inode. The offline attributes, however, indicate that the primary file server stores a partially migrated file. The client is given read access to the file as soon as the requested file data is recalled, unlike the usual fashion where the client will not get any data until the entire file is recalled. This advantage is particularly important for large files, thus making response time to a client or application much quicker.

In one preferred implementation, a partially migrated file always contains online file data (i.e., file data stored in primary storage of the primary file server) up to a certain maximum offset "y" that is less than the extent of the file. The maximum offset "y" is an offline attribute of the file. The primary file server responds to a client read request for data up to a specified offset "z" in the partially migrated offline file by checking whether the specified offset "z" is greater than the maximum offset "y", and if so, performing a partial read migration of additional file system data blocks file up to and including the file system data block containing the data for the specified offset "z" (and a certain number of additional file system data blocks), and if not, by accessing the file data in the primary file server in the usual fashion.

The primary file server may respond to a client request to truncate a partially migrated offline file at a specified offset "w" by checking whether the specified offset "w" is greater than the maximum offset "y", and if so, performing a partial read migration of additional file system data blocks up to and including the file system data block containing the data for the specified offset "w". Once the specified offset "w" is greater than the maximum offset "y", the file extent is set to "w", any file system blocks beginning after specified offset "w" are freed, and the offline file is made online. The copy of the file may then be deleted from the secondary file server.

Figure 3:
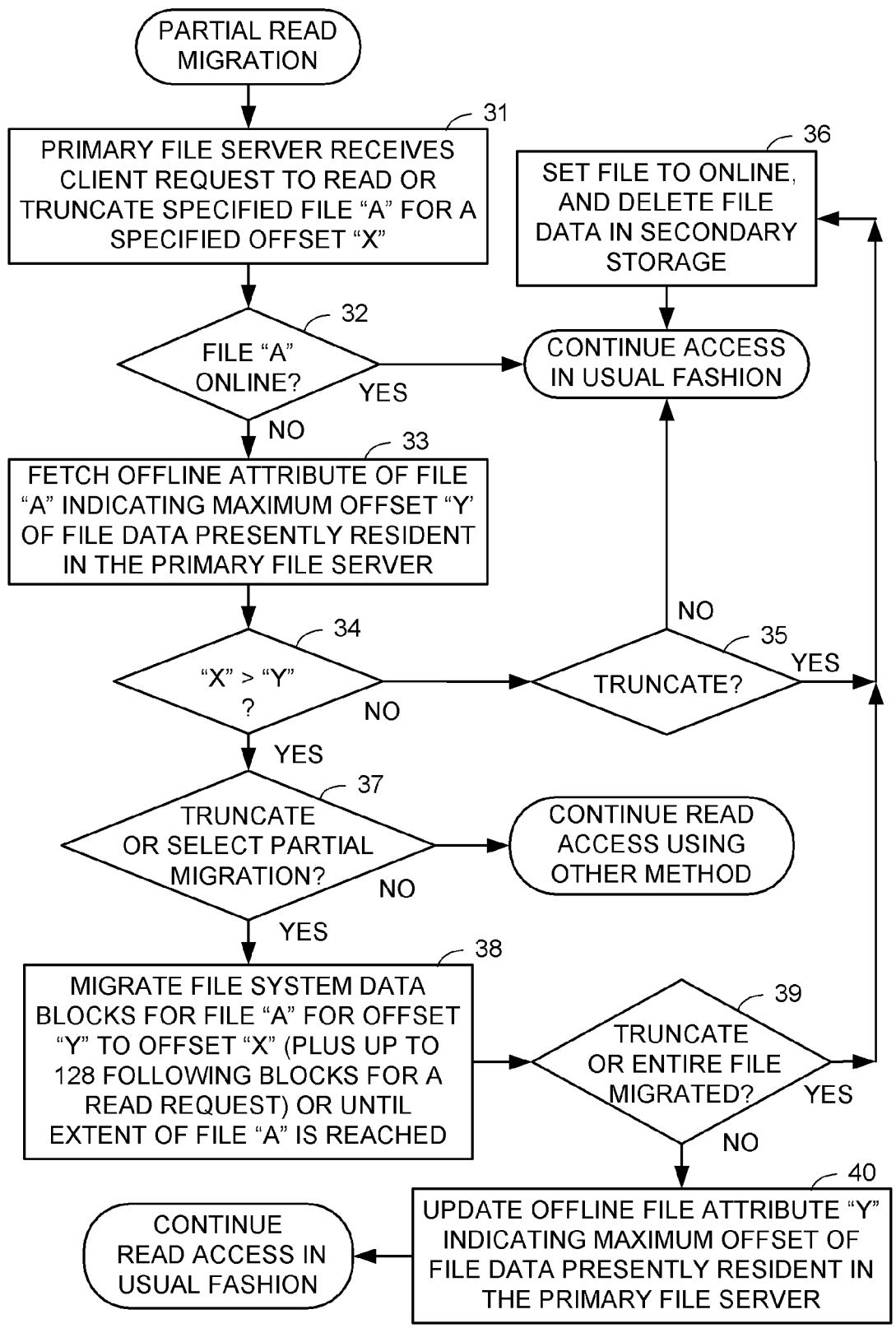
FIG. 3 is a flowchart showing how the primary file server of FIG. 1 may perform a partial read migration from a secondary file server when a client requests read access to an offline file, and showing how the primary file server may perform truncation upon a partially migrated offline file.

FIG. 3 shows programming of the primary file server for performing the partial read migration. In a first step 31, the primary file server receives a client request to read or truncate a specified file "A" for a specified offset "X". In step 32, the primary file server checks the attributes of the file "A" to determine whether the file "A" is online. If the file "A" is online, then access of the file continues in the usual fashion. Otherwise, execution continues to step 33.

In step 33, the primary file server fetches an attribute of the file "A" indicating a maximum offset "Y" of file data presently resident in the primary file server. In step 34, if the specified offset "X" is not greater than the maximum offset "Y" of data presently resident in the primary file server, then execution continues to step 35. In step 35, if the client has requested read access to the file, then the read access continues in the usual fashion. Otherwise, if the client has requested a truncation of the file, execution continues to step 36. In step 36, the primary file server sets the file attributes to indicate that the file is online, and may instruct the secondary file server to delete the file data in the secondary storage. Then file access continues in the usual fashion for a file truncation operation (by resetting the file offset to the specified offset "X", and freeing any file system blocks that do not include any file data up to and including the specified offset "X").

In step 34, if the specified offset "X" is greater than the maximum offset "Y" of data presently resident in the primary file server, then execution continues to step 37. In step 37, if truncation was requested, then execution continues to step 38. Otherwise, the primary file server selects one of a plurality of predefined methods for read access to offline file data, as further described below. If the primary file server selects the partial read migration method, then execution continues to step 38 to migrate file system data blocks for the file "A" for offset "Y" to offset "X" (plus up to 128 following blocks for a read request) or until the extent of the file is reached. In step 39, if the migration of file system blocks in step 38 has resulted in the migration of the entire file, then execution branches to step 36 to set the file to online. Otherwise, execution continues from step 39 to step 40. In step 40, the offline file attribute "Y" indicating the maximum offset of file data presently resident in the primary file server is updated, and then read access to the specified file "A" is continued in the usual fashion.

In a preferred implementation, a new file system attribute is provided for indicating whether or not the file system supports offline files and the above-described read and write migration and access methods for hierarchical storage management. A new file attribute is provided for setting a per file migration method, and overrides are also provided for the file system and also per connection. The file system migration method settings can be run-time options instead of mount options. This will allow the system administrator to temporarily override the read and write migration policies. Such an option is useful, for example, in order to use pass-through reads instead of migration during network backups from NFS. In addition, backup and virus scanning programs can override the migration method to allow pass-through reads for individual files.

Figure 4:
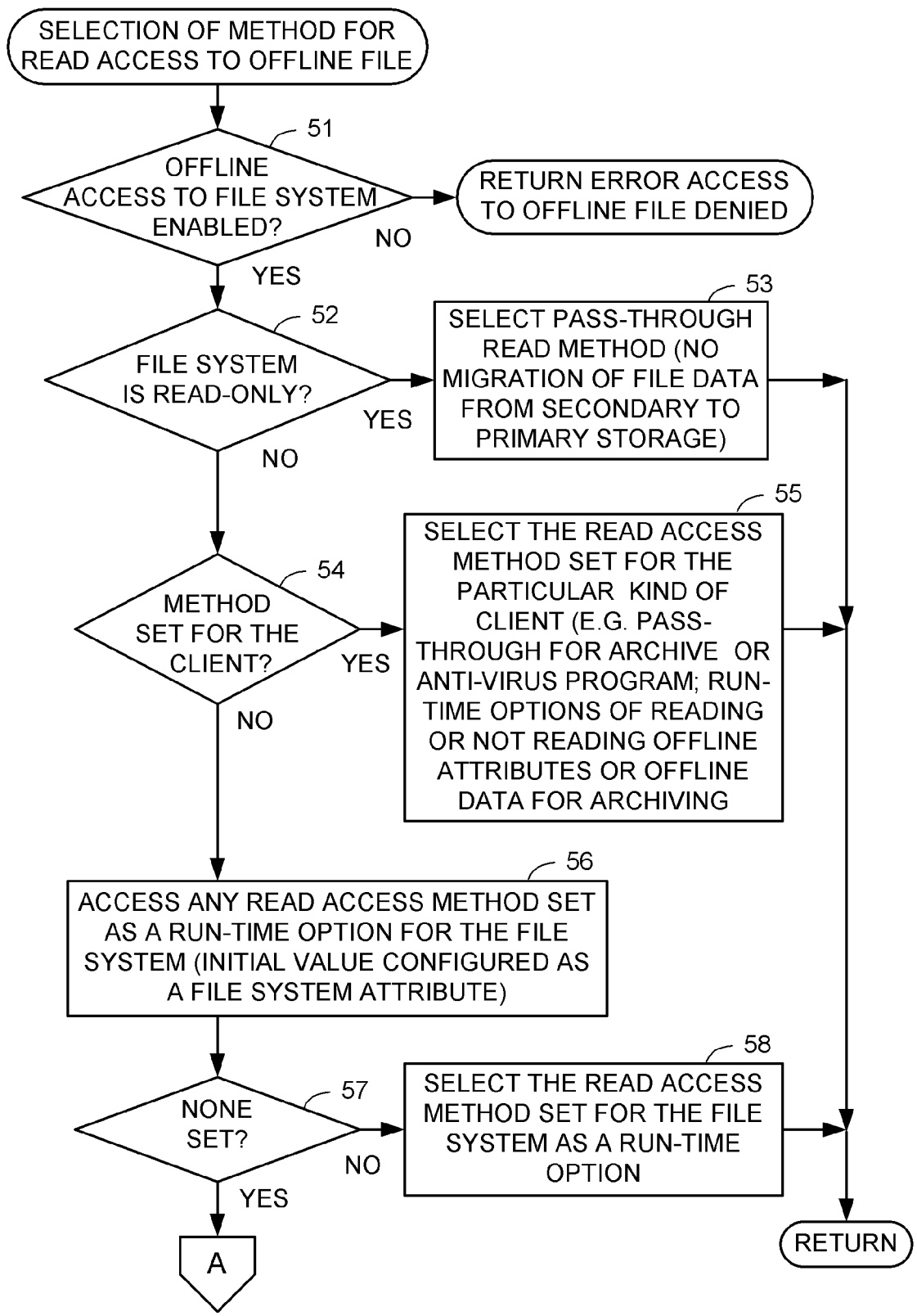
FIGS. 4 and 5 together comprise a flowchart showing how the primary file server of FIG. 1 may select a particular method for read access to an offline file.

FIG. 4 shows the preferred programming of the primary file server for selection of a method for read access to an offline file in response to a client request. In a first step 51, if offline access to the file system of the file has not been enabled, then the primary file server returns an error to the client indicating that access to an offline file has been denied because the specified file is offline and offline access to the file system including the specified file has not been enabled. Otherwise, execution continues to step 52.

In step 52, if the file system of the offline file is read-only, then execution branches to step 53 to select the pass-through read method. In this case, there is no migration of the file data from the secondary storage to the primary storage. Instead, the primary file server requests the secondary file server containing the requested data to read and return the requested data, and the primary file server receives the requested data and returns the requested data to the client without retaining the requested data in the primary storage of the primary file server. If the file system of the offline file is not read-only, then execution continues from step 52 to step 54.

In step 54, the primary file server checks whether the request for read access has been made by a particular kind of client for which a read access method has been set. If the request for read access has been made by a particular kind of client for which a read access method has been set, then execution branches to step 55 to select the read access method that has been set for the particular kind of client. For example, if the client is an archive program or an anti-virus program, then the primary file server selects the pass-through method for read access to the offline file. At least for archiving, it is also useful to provide run-time options of reading or not reading the offline attributes stored in the primary file server, and reading or not reading offline data. For virus checking, it may be desirable for the primary file server to report to the virus checker program the path to the corresponding offline file on the secondary file server, so that the virus checker program may include this path in any report of a virus infection.

It may be desirable for the archive program to backup the offline attributes, including the location of the file data on the secondary store, so that the archive program can restore both a replacement primary file server and a replacement secondary file server to the backed-up state in the event of a disaster destroying both the primary file server and the secondary file server. It may also be desirable for the archive program to have a run-time option of backing up all the file data (using pass-through reads to offline file data) but not the offline attributes for the case where it would be desirable simply to restore all the file data to one replacement primary file server. It may also be desirable for the archive program to have a run-time option of backing up the file data and offline attributes in the primary file server but not file data in secondary storage for the case where it would be desirable to backup only the file attributes in a primary file server for restoring only the portion of a file system in the primary file server in the event of a failure of the primary file server.

In step 54, if a read access method is not set for the particular kind of client, then execution continues to step 56. In step 56, the primary file server accesses any read access method set as a run-time option for the file system containing the offline file. Such a run-time option is kept in memory of the primary file server as part of the file system state, and it is initially set at boot time of the primary file server with a value that has been configured as an on-disk file system attribute. The initial value, however, can be "None", meaning that no read access method has been set for the file system. By keeping a read access method specification for offline files as part of the file system state, the read access method specification will migrate with snapshots and replicated file systems. In step 57, if a read access method has been set for the file system, then execution branches to step 58 to select the read access method that has been set for the file system. If none has been set, then execution continues from step 57 to step 61 of FIG. 5.

Figure 5:
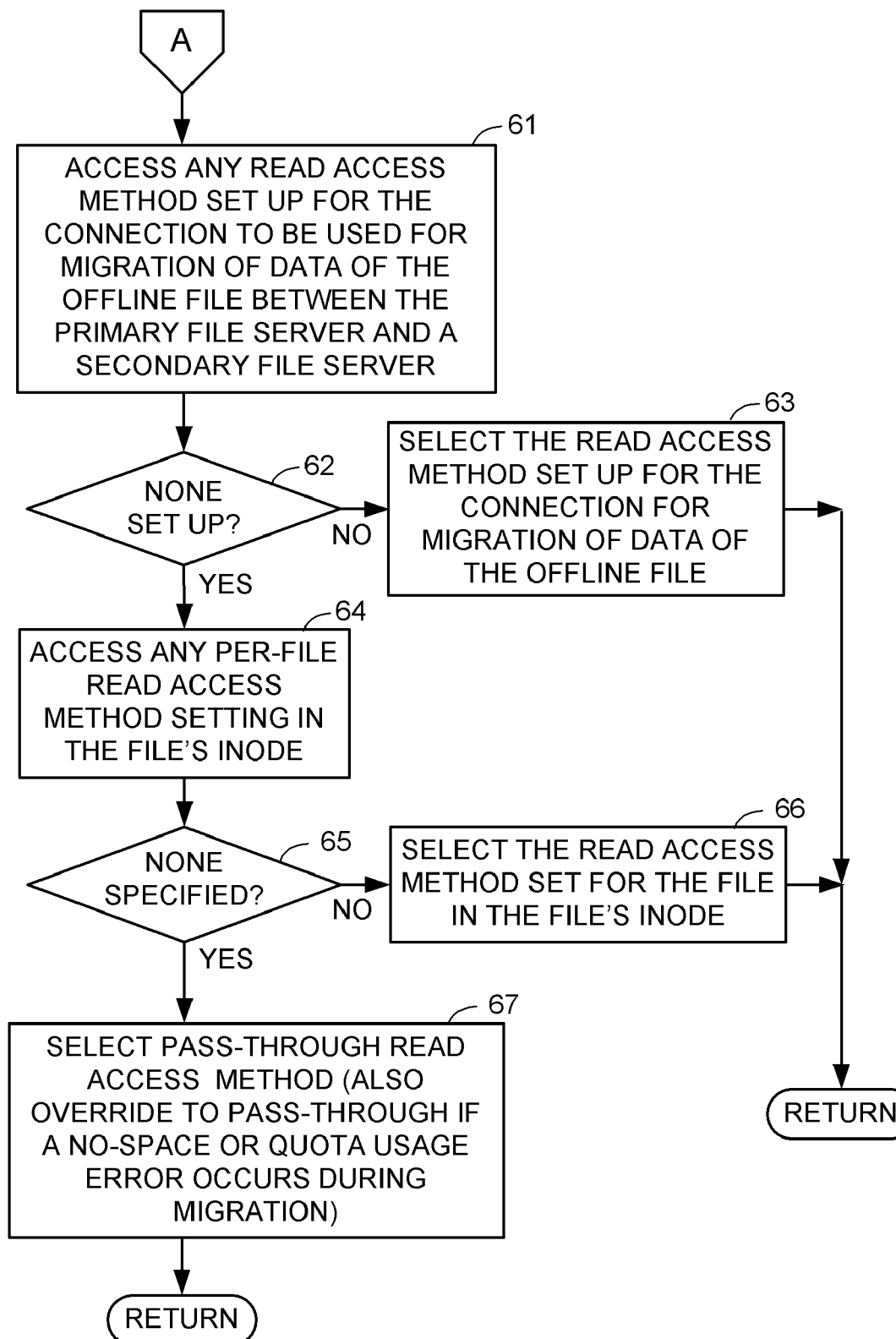

In step 61 of FIG. 5, the primary file server accesses any read access method set up in the connection database in association with the connection to be used for migration of data of the offline file between the primary file server and a secondary file server. As introduced above, the inode of the offline file has a connection_ID indexing or pointing to an entry in the connection database for the file system including the offline file. This entry includes a read migration method attribute specifying an offline file read access method or "None" if none has been set up for the connection. If a read migration method has been set up for the connection, then execution branches from step 62 to step 63 to select the read access method that has been set up for the connection for migration of data of the offline file. In step 62, if none has been set up for the connection, then execution continues from step 62 to step 64.

In step 64, the primary file server accesses any per-file read access method setting in the offline file's inode (i.e., the inode of a stub file). In step 65, if a read access method is specified in the offline file's inode, then execution branches to step 66 to select the read access method set for the offline file in the offline file's inode. In step 65, if none has been specified in the offline file's inode, then execution continues to step 67.

In step 67, the primary file server selects, as a default, the pass-through read access method. Moreover, if a no-space or quota usage error occurs during read migration by the other methods, then the read access method will override to pass-through so that no more primary storage will be allocated during the read access.

The selection of a method for read access to a paused offline file system is handled as shown in FIGS. 4 and 5. If the selected read access method is partial or full migration, however, the migration will not occur until the file system is unpaused.

Figure 6:
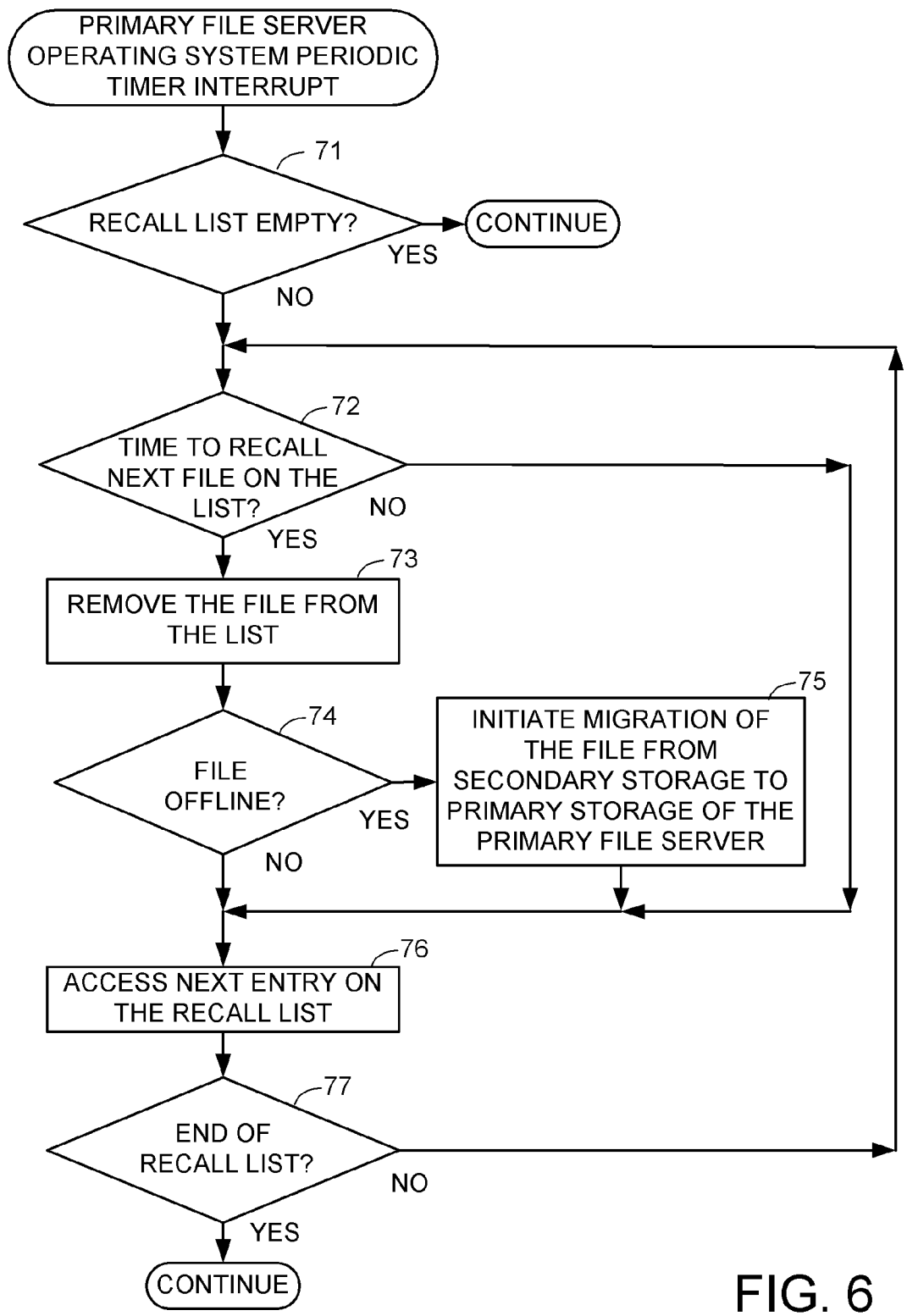
FIG. 6 is a flowchart of a procedure for servicing a recall list in a primary file server.

FIG. 6 shows a flowchart of a procedure used in the primary file server for servicing the recall list (75 in FIG. 2). This procedure is part of a periodic timer interrupt routine of the operating system of the primary file server. For example, the recall list is serviced once every 30 seconds. It would also be possible to have multiple recall lists, each serviced at a respective interval of time.

In a first step 71 of FIG. 6, if the recall list is empty, then the servicing of the list is finished for the current interval. The periodic timer interrupt routine can continue servicing other tasks. Otherwise, execution continues from step 71 to step 72. In step 72, the recall time of the next entry on the recall list is compared to the present time to determine whether it is time to recall the file of this entry on the recall list. If so, then execution continues to step 73 to remove the file from the list. In step 74, if the file is presently offline, then in step 75 the primary file server initiates migration of the file from secondary storage to primary storage of the primary file server. Execution continues from step 75 to step 76. Execution also continues to step 76 from step 74 if the file is online. Execution also continues to step 76 from step 72 if it is not time to recall the next file on the recall list.

In step 76, the next entry on the recall list is accessed. If the end of the recall list is not reached, as tested in step 77, then execution loops back to step 72 to service this next entry on the recall list. Otherwise, servicing of the recall list is finished for the present time interval, and the periodic timer interrupt routine continues from step 77 with servicing of other tasks.

In a preferred implementation, the offline file attributes used for hierarchical storage management are stored in an opaque data area of each inode. The offline inode fields include an inode type (e.g. migration or hierarchical storage) and inode connection type (NFSv2, NFSv3, CIFS, or other);

offline inode related flags (e.g. a flag for indicating that the migration inode field is invalid, and a flag for indicating that the offline inode has been modified); a staging (migration) inode number for keeping track of pull-in progress during migration; the per offline file read and write access methods (for read, coded as either Default, Full Migration, Pass-through, Partial, or None, and for write, coded as either Default, Write-recall full, Pass-through override, Pass-through multi-version, or None); a verifier such as file modification time for the secondary data file; a migration in-progress connection ID pointing to the open connection in the connection database for the file system; a file handle (NFS only); a URL specifying an absolute path to the secondary storage file and including a server name, a CIFS share name or NFS export path, and a relative pathname in the share or export path. Since the offline attributes are opaque, file system calls can be provided to permit archiving programs to directly access and update the offline attributes.

For consistency, the various threads that modify the offline inode's opaque data contents should use a locking mechanism. For example, any thread that updates the offline inode should use the following sequence: (1) acquire a migration mutex for the inode; (1) read the opaque data structure; write the opaque data structure; release the migration mutex for the inode.

In a preferred implementation, the per file system parameters for hierarchical storage management include the following: hierarchical storage enabled/disabled; offline attribute true/false; offline access error timeout (time limit for reporting slow access to secondary storage); offline backup policy (offline attributes saved or not, offline data saved or not); file system read migration policy (Default, Full, Partial, or None); file system write migration policy (Default, Write-recall full, Pass-through override, Pass-through multi-version, or None). The default backup policy (for CIFS) is save offline data.

Figure 7:
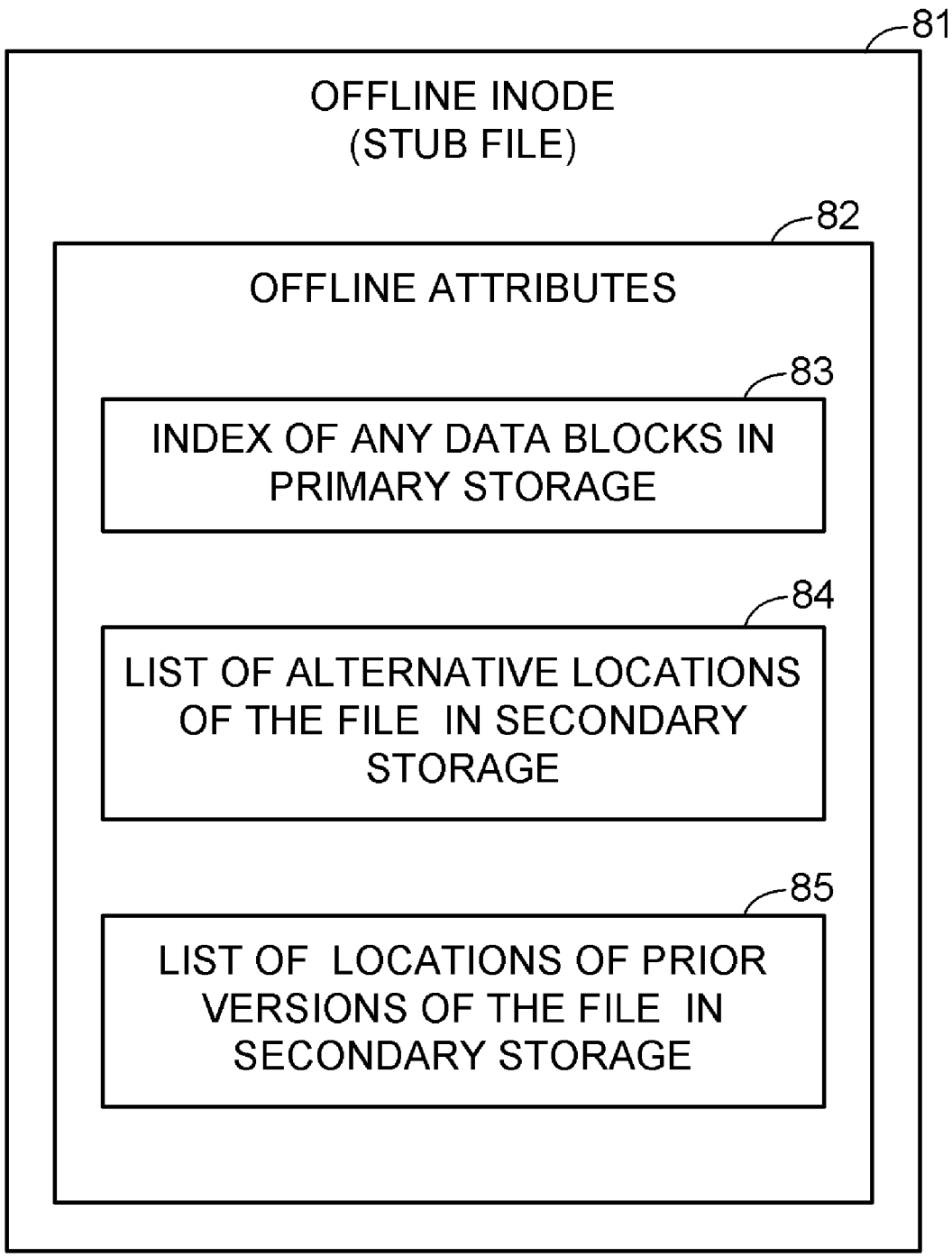
FIG. 7 is a block diagram of an offline inode including a map of data blocks in primary storage, a list of alternative locations of copies of the file in secondary storage, and a list of locations of prior versions of the file in secondary storage.

As shown in FIG. 7, the offline inode 81 (i.e., the stub file) can include additional offline attributes for extended functionality. As described above, for one preferred implementation, a partially migrated file always includes on-line file data up to a specified offset "y". This implementation is satisfactory for sequential files having file blocks that are usually read by a client consecutively starting with a first file data block. As shown in FIG. 7, for supporting efficient partial read migration of randomly-accessed files, the offline file attributes may include an index 83 of any data blocks in primary storage. The index 83, for example, is a hash index of the kind typically used for indexing a cache memory of a cached disk storage array. When an offline file has such an index 83 and a client requests data contained in a data block or a range of data blocks, the index 83 is accessed, and if the index 83 indicates that one or more of the requested data blocks are absent from the primary storage of the primary file server, then only the absent data blocks are migrated from secondary storage to the primary storage in response to the client request.

As further shown in FIG. 7, the offline inode 81 may include a list 84 of alternative locations of the file in secondary storage. Such a list 84 of alternative locations is useful where multiple identical copies of a file have been stored in secondary storage in order to provide high availability, flow control, or load balancing. For disaster protection, for example, one copy is kept in secondary storage at a location close to the primary file server, and at least one other copy is kept in secondary storage at a geographically remote location. If the local copy in secondary storage is unavailable, then the remote copy is accessed. In this case, the list 84 of alternative locations is ordered by the geographic proximity of the respective copies in the secondary storage, and the entries of the list 84 are sequentially accessed in order of priority until a copy is found to be accessible. In general, to provide high availability, the alternative locations in the list 84 can be ordered based on the estimated access time from respective locations, so that attempts are first made to access secondary storage likely to provide fast access to the data.

It is also possible, however, for respective copies of a file to be stored at a plurality of equally accessible secondary storage sites. The primary file server can select a particular copy to be accessed based on load balancing or flow control. For example, for load balancing, the primary file server can use the well-known round-robin method in which a next one of the copies in the list is selected each time one of the copies needs to be accessed. Flow control can be implemented by the secondary sites reporting to the primary file server conditions of high loading or unavailability so that the primary file server will discount or avoid selection of a secondary site reporting high loading or unavailability. Statistics on the response time at the various secondary locations can be collected and used to frequently prioritize or modify the alternative locations in the list 84.

FIG. 7 further shows that the offline attributes 82 may include a list of locations of prior versions of the file in secondary storage. Each prior version of the file is a snapshot copy of a prior consistent state of the file as it existed at a particular point in time. A client, for example, may request one or more of these prior versions of the file for recovery purposes if the present version of the file becomes unavailable due to a widespread system failure or due to inadvertent or malicious data corruption. A snapshot copy facility can create the prior versions of the file while permitting concurrent read-write access to the file. Such a snapshot copy facility, for example, is described in Keedem U.S. Pat. No. 6,076,148 issued Jun. 13, 2000, incorporated herein by reference, and in Armangau et al., U.S. Pat. No. 6,792,518, incorporated herein by reference, and Bixby et al., U.S. Patent Application Pub. No. 2005/0065986 published Mar. 24, 2005 entitled "Maintenance of a File Version Set Including Read-Only and Read-Write Snapshot Copies of a Production File," incorporated herein by reference. Snapshot copies have been used for a variety of data processing and storage management functions such as storage backup, transaction processing, and software debugging.

Figures 8, 9:
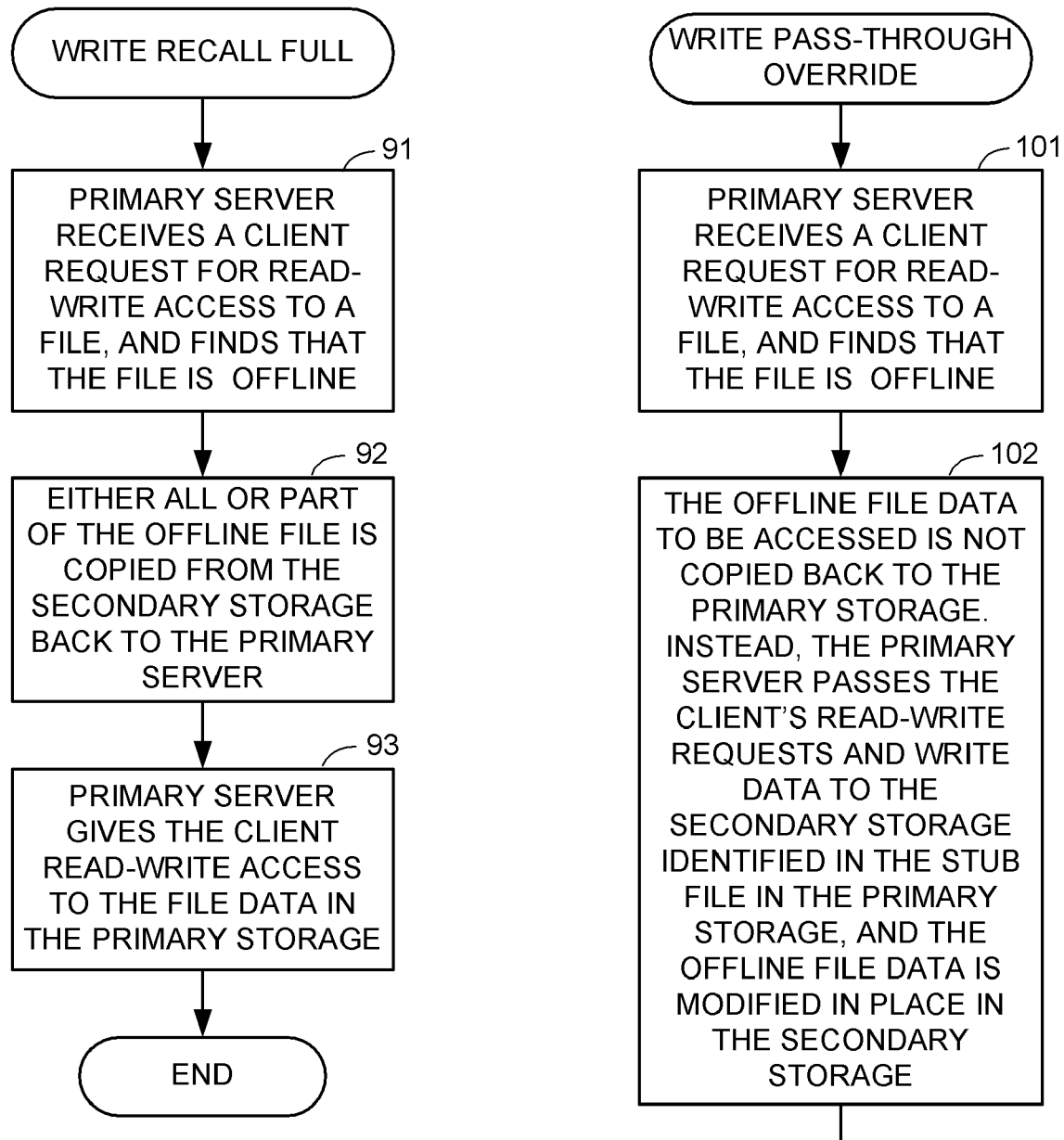
FIG. 8 is a flowchart of a procedure implementing a "write recall full" migration policy in the data network of FIG. 1.
FIG. 9 is a flowchart of a procedure implementing a "write pass-through override" migration policy in the data network of FIG. 1.

FIG. 8 shows how the primary server implements the "write recall full" migration policy. In a first step 91, the primary server receives a client request for read-write access to a specified file, and finds that the specified file is offline. In step 92, either all or part of the offline file is copied from the secondary storage back to the primary server. Finally, in step 93, the primary server gives the client read-write access to the file data in the primary storage.

FIG. 9 shows how the primary server implements the "write pass-through override" migration policy. In a first step 101, the primary server receives a client request for read-write access to a specified file, and finds that the specified file is offline. In the next step 102, the offline file data to be accessed is not copied back to the primary storage. Instead, the primary server passes the client's read-write requests and write data to the secondary storage identified in the stub file in the primary storage, and the offline file data is modified in place in the secondary storage.

It is desired to have a separate write pass-through migration policy for creating a new version of a file on secondary storage each time that a client opens the file and writes to it. The modifications made after the file is opened by the client and until it is closed are passed through to the new version of the file on secondary storage. This is desired when new data should be moved to secondary storage quickly and at least one prior version should be kept in secondary storage for backup or recovery purposes. The secondary storage can be provided with a snapshot copy facility and the primary server can maintain a corresponding stub file for at least the most recent version of the file. The write pass-through multi-version policy would be valid for client access protocols that include file open and close events, such as NAS client access via CIFS, NFSv4 and FTP. This policy would not be valid for client access protocols that do not include file open and close events, such as versions 2 and 3 of the NFS protocol.

There are two aspects to consider when creating new versions of files on secondary storage for the file write pass-through policy. The first is how the different versions of the files should be identified or named. The second is at what granularity the file versioning should occur.

With respect to the identification of different versions of files, each version of a file on secondary storage should appear as a separate file name in order for each version to be separately addressed by existing stub files in the primary file system(s). One simple approach is to append a numeric suffix to the file name for each new version of the file. Care should be taken to detect and cope with any file name conflicts.

With respect to the file versioning granularity, a simple approach is to create an entirely new copy of the file in question for each version required. While simple this approach has a number of disadvantages. If the changes to the file between versions are small, then this approach will consume significantly more secondary storage space than is strictly required. Depending on the size of the file, creating an entirely new copy of it could take a significant length of time and consume significant resources on both the network between primary and secondary storage as well processing resources on the primary storage server.

Instead of creating an entirely new copy of a file each time that a new version is required, it is preferred to use a snapshot copy facility that creates block level differential versions of files. In this case only those blocks that are changed between versions of the files are stored in each version of the file. Blocks common between versions are stored only once. While block level differential versioning is more complex, it requires less space on secondary storage, and permits new versions of files to be created more quickly. Block level differential versioning could be enhanced to include compression of the file data to further reduce the space requirements on secondary storage.

Figure 10:
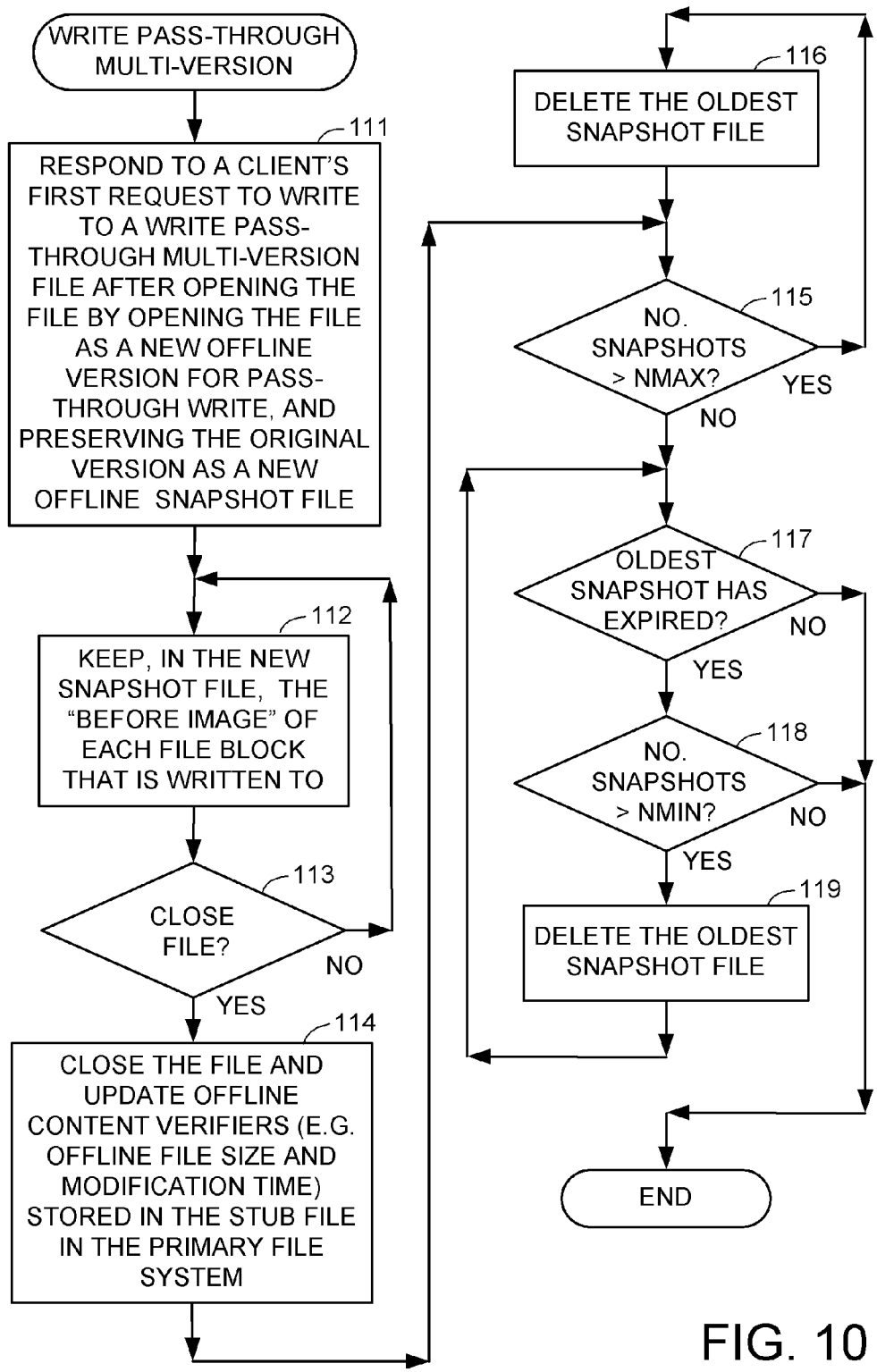
FIG. 10 is a flowchart of a procedure implementing a "write pass-through multi-version" migration policy in the data network of FIG. 1.

FIG. 10 shows how a primary server and secondary server implement the "write pass-through multi version" policy. In a first step 111, when a client opens and first writes to a write pass-through multi-version file, a new version of this offline file is created for pass-through write, and the original version is preserved as an offline snapshot file. For example, the primary file server responds to the client's first request to write to the multi-version offline file after opening the file by copying an original stub file to produce a stub file for the new offline snapshot.

In step 112, the "before image" of each file block that is written to is kept in the new snapshot file. For example, this is done by a snapshot copy facility in the secondary file server. This snapshot copy facility maps or links the new snapshot file to the "before image" of each file block that is changed in the new pass-through write version, and also maps or links the new snapshot file to the file blocks in the in the new pass-through write version that have not yet been changed. Thus, the file blocks in the new snapshot file that have not yet been changed in the new write-through version are shared between the new snapshot file and the new write-through version. In step 113, execution loops back to step 112 until the client requests the primary server to close the write-through file. When the client requests the primary server to close the write-through file, execution continues to step 144. In step 114, the primary server closes the file and updates offline content verifiers (e.g., offline file size and modification time) stored in the stub file in the primary file system.

For efficient use of secondary storage, it is often desirable to limit the number or retention time of snapshots for certain write pass-through multi-version file. For example, the default would be to keep all versions, but each write pass-through multi-version file could have specified values for one or more of the following three attributes: NMAX, specifying a maximum number of snapshots; MAXAGE, specifying an expiration age of a snapshot (e.g., in terms of a specified number of hours, days, weeks, months, years, or some combination thereof); and NMIN, specifying a minimum number of expired snapshots to keep. Initially, these attributes have default values such as infinite values for NMAX and MAXAGE, and a value of 1 for NMIN. These three attributes could be used to limit the number and retention time of the snapshots as shown in steps 115 to 119 of FIG. 10. For example, steps 115 to 119 could be performed by the primary server or the secondary server at the time of opening or closing of the pass-through write file.

In step 115, if the number of snapshots for the pass-through write file is greater than NMAX, then execution branches to step 116. In step 116, the oldest snapshot of the pass-through write file is deleted. This involves at least the deletion of any snapshot stub file of the oldest snapshot in the primary server and the deletion of any "before image" file blocks of the oldest snapshot that are not shared with any other snapshot. From step 116, execution loops back to step 115. Once the number of snapshots is no longer greater than NMAX, execution continues from step 115 to 117. In step 117, if the oldest snapshot has expired, execution continues to step 118. The oldest snapshot has expired if its age (i.e., the difference between the present time and the creation time of the snapshot) exceeds MAXAGE for snapshots of the pass-through write file. In step 118, if the number of snapshots is greater than NMIN, then execution continues to step 119 to delete the oldest snapshot file. Execution loops back to step 117. Once the oldest snapshot has not expired, as found in step 117, or the number of snapshots is not greater than NMIN, as found in step 118, the procedure of FIG. 10 is finished.

The write-through policies described above handle writes to existing migrated files. Client applications, however, may create new files. It is desired to have a way of setting write pass-through policies on new files that is transparent to client applications. A solution to this problem is to implement a write-through policy for directories to handle the creation of new files. That is, attributes can be set in a directory so that all new files that are created in this directory assume a pass-through write policy determined by those attributes, and upon creation, each new file is written through to a secondary storage location also determined by those attributes.

The directory write pass-through policy could be set on individual directories, or whole directory trees (i.e., a directory and any existing or subsequently created sub-directories). A policy setting applied to a directory tree could be overridden by a different policy setting on specific sub-directories or sub-directory trees.

To support the directory write pass-through policy, the primary file server recognizes API set and get attribute calls issued against directories. These calls can be variations on the existing get and set attribute calls for files, or these calls can be new API calls. These directory calls support enabling and disabling the write pass-through policy, whether the setting is recursive or not, and what the read and write policies should be set to for files that are migrated out using this directory policy.

Figure 11:
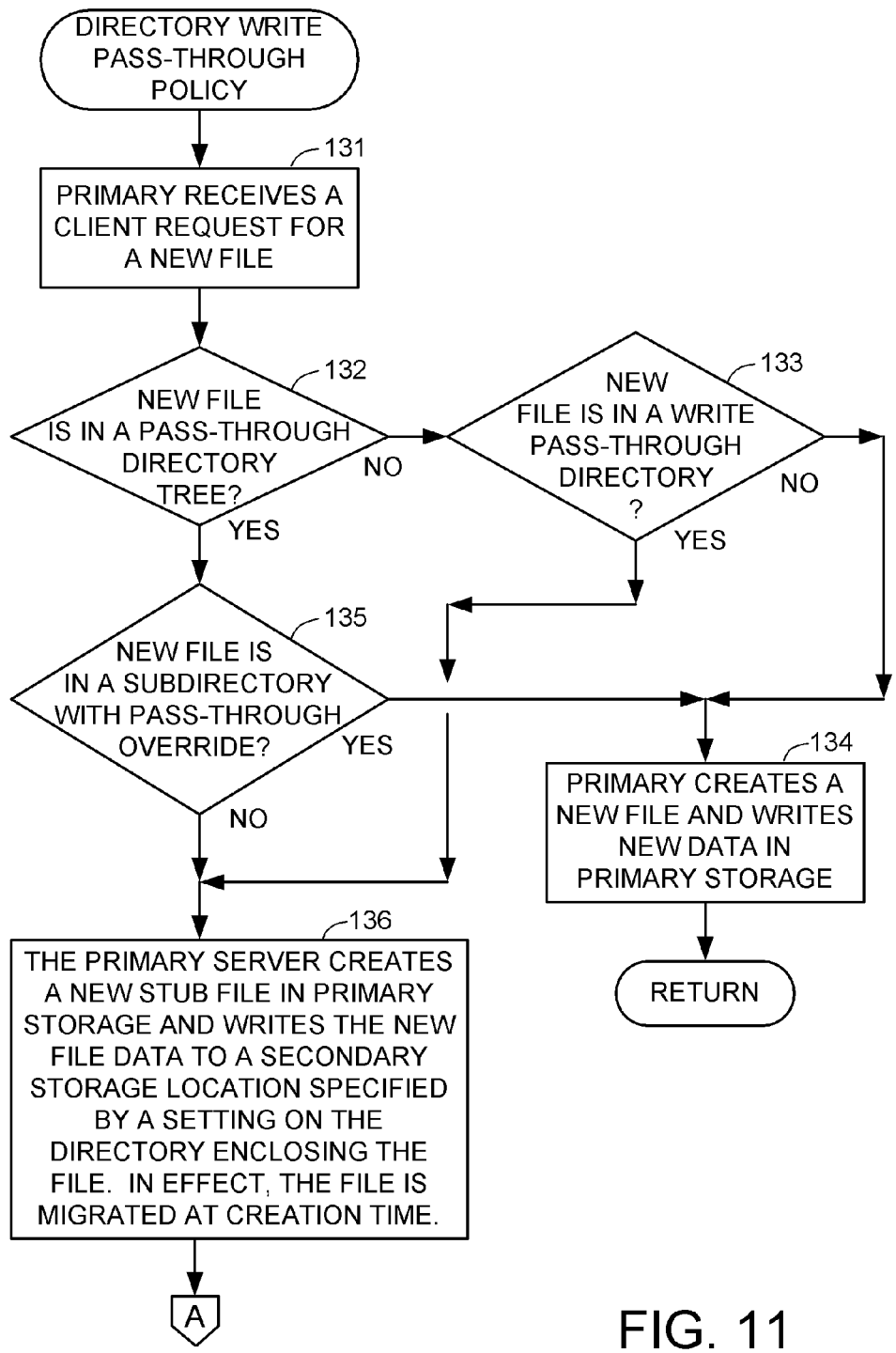
FIGS. 11-12 comprise a flowchart of a procedure implementing a "directory write pass-through" migration policy in the data network of FIG. 1.
Figure 12:
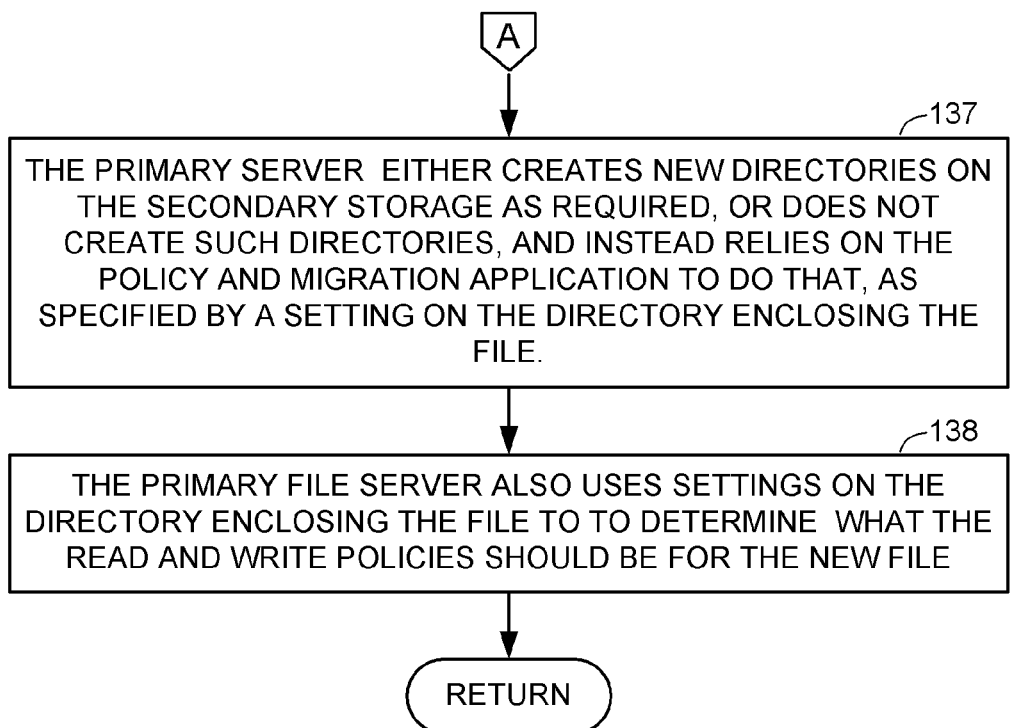

FIGS. 11-12 show a procedure followed by the primary server for implementing the "directory write pass-through" migration policy. In a first step 131, the primary server receives a client request for creating a new file. The client's request, for example, includes a pathname through a file system, and the file system manager of the primary server searches this pathname to access the directory to contain the new file. In step 132, during this search, the primary checks each directory in the pathname for a directory attribute indicating whether or not the directory is the root of a write pass-through directory tree. If not, then in step 133, the primary checks whether the directory to contain the new file has this attribute set to indicate that this directory is a write pass-through directory. If not, then execution branches to step 134. In step 134, the primary creates the new file in the usual fashion and writes data from the client into this new file by writing the file data into primary storage. The procedure is finished upon completion of step 134.

In step 133, if the directory to contain the new file is a write pass-through directory, then execution continues to step 136. In step 136, the primary server creates a new stub file in the primary storage. The primary server links this new stub file into the directory to contain the new file. The primary, however, writes data from the client for the new file to a secondary storage location specified by a setting on the directory enclosing the new file. In effect, the new file is migrated to secondary storage when the new file is created.

In step 132, if the new file is in a write pass-through directory tree, then execution continues to step 135. In step 135, if the new file is in a subdirectory having a pass-through override attribute set, then execution branches to step 134 in order to create the new file in primary storage and write new data for the file into primary storage. Otherwise, if the new file is not in a subdirectory having a pass-through override attribute set, then execution continues from step 135 to step 136 in order to create a new stub file in primary storage and write new data to a secondary storage location specified by a setting on the directory enclosing the file.

From step 136, execution continues to step 137 of FIG. 12. In step 137, a directory may be created on the secondary storage in order to support the new file. The primary server either creates new directories on the secondary storage as required, or does not create such directories, and instead relies on the policy and migration application to do that, as specified by a setting on the directory enclosing the file.

From step 137, execution continues to step 138. In step 138, the primary file server also uses settings on the directory enclosing the file to determine what the read and write migration policies should be for the new file, and to set these policies in the corresponding stub file for the new file. The procedure is finished upon completion of step 138.

FIG. 13 shows various ways of setting the write migration policies. In step 141, the write policy for a file is set on the corresponding stub file at the time of migration of the file from the primary server to the secondary storage. For example, the write policy is set to either write recall full (the typical default), write pass-through overwrite, or write pass-through multi-version. However, in step 142, the default or write policy setting on the corresponding stub file is overridden by any connection or file system write policy setting applicable to the file. In step 143, regardless of the write policy for the file data, an option could be set for pass-through to secondary storage of certain modifications of meta-data such as security attributes or alternative data streams. Therefore, if the primary storage would become unavailable due to a failure of the primary server, the modified metadata would be available in secondary storage for better protection, access, or recovery of the version of the data remaining in secondary storage.

In step 144, if the stub file has multiple offline paths, then the file write pass-through activity is done to all offline paths. Also newly created files under directory write pass-through policy are migrated to these offline paths immediately upon file creation.

In step 145, a single file could have multiple write or read migration policies. For example, the logical extent of the file could be split up into sections. Each section of the file could have a different write or read migration policy. Multiple stub files could be created for the file, including one for each section having a different policy. Assigning a different policy to a different section of a file could be static (e.g., done once upon file creation) or dynamic (e.g., changed at any time after file creation).

Figure 14:
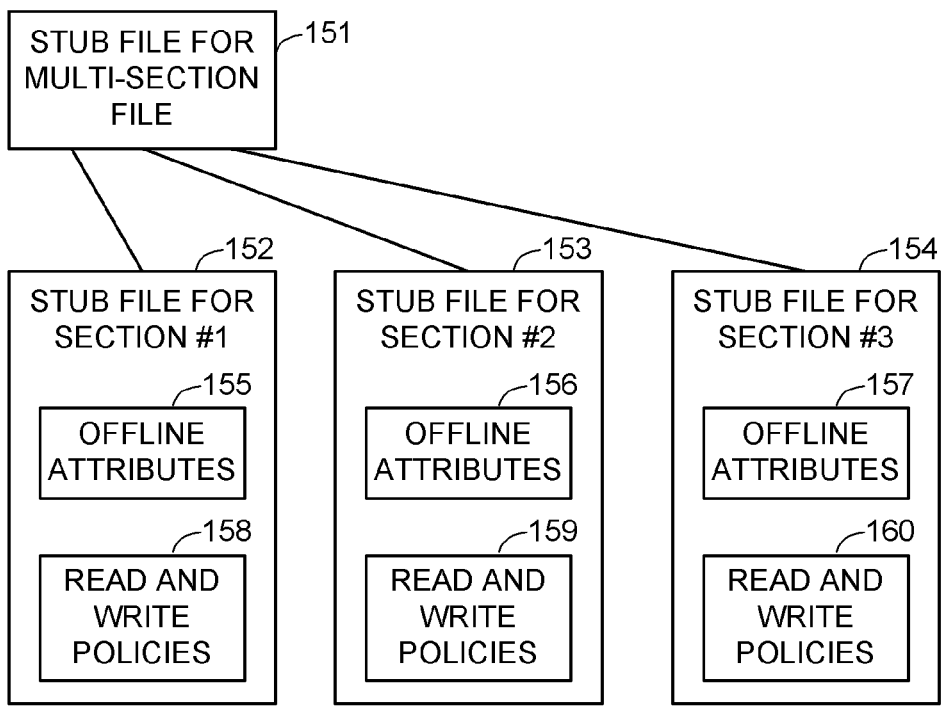
FIG. 14 shows a set of stub files for a multi-section file having different offline attributes and different read and write migration policies for each section of the file.

As shown in FIG. 14, a single multi-section file could have multiple stub files, including a stub file 151 for the entire file, and a respective stub file 152, 153, 154 for each section of the file. The stub file 151 could store an attribute indication that it is a multi-section file, and the stub file 152, 153, 154 for each section of the file could store respective offline attributes 155, 156, 157 and respective read and write policies 158, 159, and 160 for the file. For example, a multi-section file could have a first section that is "write recall full" and "read recall full", and a second section that is "write pass-through overwrite" and "read recall partial". The first section would be used for storing file data that is frequently read and written, and the second section would be used for storing file data that is often read but infrequently written. For example, the first section could store an index or concordance for a voluminous text document in the second section.

In view of the above, there have been described a number of write pass-through policies that simplify the allocation and management of primary storage space. Primary storage space can be conserved for critical applications. Migrated files can be modified and new files can be created without fear of the primary file system becoming full or exceeding quotas for the files on the primary storage. When writing a small amount of data to a large file, performance can be enhanced by avoiding migration of file data from secondary storage to primary storage and eventually back to secondary storage. The write pass-through multi-version policy maintains multiple versions of a file on secondary storage in a way that is transparent to applications and transfers the burden of creating and managing the multiple versions to a secondary file server. The secondary storage need not be limited to inexpensive mass storage for backup and recovery applications. For example, the write pass-through policies permit the primary server to function as an advanced multi-protocol switch for file virtualization by distributing file data to multiple secondary storage locations having various levels of performance.

What is claimed is:

1. A method of operation in a data network including a file server for access to file data that is migrated between primary storage and secondary storage, said method comprising:

the file server responding to a client request for write access to a specified file by checking whether file data of the specified file has been migrated from the primary storage to the secondary storage, and upon finding that file data of the specified file has been migrated from the primary storage to the secondary storage, performing a write pass-through in which data of the specified file is not recalled from the secondary storage to the primary storage in response to the client request for write access to the specified file and file data from the client is written to the secondary storage, wherein the file server follows a write pass-through multi-version policy resulting in a new offline version of a multi-version file each time that a client opens and writes to the multi-version file.

2. The method of operation as claimed in claim 1, wherein the file server follows the write pass-through multi-version policy by opening the multi-version file as a new offline version for pass-through write and preserving an original version of the multi-version file as a snapshot file in response to a first request from the client to write to the multi-version file following a request from the client to open the multi-version file.

3. The method of operation as claimed in claim 1, wherein the file server following the write pass-through multi-version policy further includes the file server updating offline content verifiers of the multi-version file upon closing the multi-version file.

4. The method of operation as claimed in claim 3, wherein the file server updates the offline content verifiers of the multi-version file in a corresponding stub file for the multi-version file, the stub file being stored in the primary storage.

5. The method of operation as claimed in claim 3, wherein the content verifiers include an offline file size and modification time.

6. The method of operation as claimed in claim 1, wherein the multi-version file has at least one attribute used for controlling selective retention of snapshots of the multi-version file by deleting an oldest one of the snapshots of the multi-version file upon inspecting said at least one attribute.

7. The method of operation as claimed in claim 1, which includes using at least three attributes of the multi-version file for controlling selective retention of snapshots of the multi-version file, the attributes specifying a maximum number of snapshots to keep, an expiration age of the snapshots, and a minimum number of expired snapshots to keep.

8. The method of operation as claimed in claim 1, which further includes the file server following a directory write pass-through policy resulting in a new offline file when a file is created within a write pass-through directory.

9. The method of operation as claimed in claim 8, wherein the file server following the directory write pass-through policy includes the primary file server writing new file data for the new offline file to a secondary storage location specified by a setting on the write pass-through directory.

10. The method of operation as claimed in claim 1, which further includes the file server following different write migration policies for different sections of a multi-section offline file, as specified by at least one write policy attribute of the multi-section offline file.

11. The method of operation as claimed in claim 10, which includes the file server accessing in primary storage a respective stub file for each section of the multi-section offline file in order to determine the write migration policy and offline attributes of said each section of the multi-section offline file.

12. A method of operation in a data network including a file server for access to file data that is migrated between primary storage and secondary storage, said method comprising:
the file server responding to a client request for write access to a specified file by checking whether file data of the specified file has been migrated from the primary storage to the secondary storage, and upon finding that file data of the specified file has been migrated from the primary storage to the secondary storage, performing a write pass-through in which data of the specified file is not recalled from the secondary storage to the primary storage in response to the client request for write access to the specified file and file data from the client is written to the secondary storage, wherein the file server follows a directory write pass-through policy resulting in a new offline file when a file is created within a write pass-through directory.

13. The method of operation as claimed in claim 12, wherein the file server following the directory write pass-through policy includes the primary file server writing new file data for the new offline file to a secondary storage location specified by a setting on the write pass-through directory.

14. The method of operation as claimed in claim 12, wherein the file server either creates a new directory on the secondary storage for the new offline file or does not create a new directory on the secondary storage as selected by a setting on the write pass-through directory.

15. The method of operation as claimed in claim 12, wherein the file server sets read and write migration policies for the new file as selected by settings on the write pass-through directory.

16. The method as claimed in claim 12, which includes the file server finding that the write pass-through directory is in a write pass-through directory tree, and the file server finding that the write pass-through directory does not have a pass-through override option set.

17. The method of operation as claimed in claim 12, which further includes the file server following different write migration policies for different sections of a multi-section offline file, as specified by at least one write policy attribute of the multi-section offline file.

18. The method of operation as claimed in claim 17, which includes the file server accessing in primary storage a respective stub file for each section of the multi-section offline file in order to determine the write migration policy and offline attributes of said each section of the multi-section offline file.

19. A method of operation in a data network including a file server for access to file data that is migrated between primary storage and secondary storage, said method comprising:
the file server responding to a client request for write access to a specified file by checking whether file data of the specified file has been migrated from the primary storage to the secondary storage, and upon finding that file data of the specified file has been migrated from the primary storage to the secondary storage, performing a write pass-through in which data of the specified file is not recalled from the secondary storage to the primary storage in response to the client request for write access to the specified file and file data from the client is written to the secondary storage, wherein the file server follows different write migration policies for different sections of a multi-section offline file, as specified by at least one write policy attribute of the multi-section offline file.

20. The method of operation as claimed in claim 19, which includes the file server accessing in primary storage a respective stub file for each section of the multi-section offline file in order to determine the write migration policy and offline attributes of said each section of the multi-section offline file.

* * * * *